US009734499B2

(12) United States Patent
Subbaraj

(10) Patent No.: US 9,734,499 B2
(45) Date of Patent: Aug. 15, 2017

(54) SYSTEMS AND METHODS FOR FACILITATING TRANSACTIONS USING PATTERN RECOGNITION

(71) Applicant: PAYPAL, INC., San Jose, CA (US)

(72) Inventor: Puvanenthiran Subbaraj, Chennai (IN)

(73) Assignee: PAYPAL, INC., San Jose, CA (US)

( * ) Notice: Subject to any disclaimer, the term of this patent is extended or adjusted under 35 U.S.C. 154(b) by 246 days.

(21) Appl. No.: 14/164,051

(22) Filed: Jan. 24, 2014

(65) Prior Publication Data

US 2015/0213448 A1 Jul. 30, 2015

(51) Int. Cl.
*G06Q 40/00* (2012.01)
*G06Q 20/40* (2012.01)
*G06Q 20/32* (2012.01)
*G06Q 30/04* (2012.01)
*G06Q 20/08* (2012.01)

(52) U.S. Cl.
CPC ....... *G06Q 20/4014* (2013.01); *G06Q 20/085* (2013.01); *G06Q 20/3224* (2013.01); *G06Q 30/04* (2013.01)

(58) Field of Classification Search
CPC .................................................. G06Q 20/085
USPC ............................................................ 705/40
See application file for complete search history.

(56) References Cited

U.S. PATENT DOCUMENTS

| 5,664,099 A * | 9/1997 | Ozzie ..................... G06F 21/36 713/183 |
| 7,004,394 B2 | 2/2006 | Kim |
| 8,010,414 B2 | 8/2011 | Silverbrook et al. |
| 8,554,280 B2 | 10/2013 | Patel et al. |
| 2007/0082710 A1 | 4/2007 | Jang |
| 2009/0222770 A1 | 9/2009 | Chang |
| 2010/0045627 A1 | 2/2010 | Kennedy |
| 2012/0173242 A1* | 7/2012 | Sarkar ................... G10L 19/018 704/260 |
| 2015/0186984 A1* | 7/2015 | Loganathan ....... G06Q 30/0641 705/27.1 |

\* cited by examiner

*Primary Examiner* — Edward Chang
(74) *Attorney, Agent, or Firm* — Haynes and Boone, LLP

(57) ABSTRACT

Systems and methods are provided for online transactions using pattern recognition. A user of a payment provider may create and register patterns drawn by the user on a pattern entry image. The user may register the patterns by associating transaction options with each drawn pattern. Each pattern may be used to execute a particular transaction such as a purchase transaction, a payment of a specific amount, a payment to a specific recipient, or a sales transaction. When the user wishes to execute a transaction such as an online payment to a particular recipient for a particular amount, the user can redraw the registered pattern associated with payments to that recipient for that amount. A pattern can be drawn at a particular location on the pattern entry image. Different transactions can be associated with patterns drawn at different locations.

20 Claims, 15 Drawing Sheets

SYSTEMS AND METHODS FOR FACILITATING TRANSACTIONS USING PATTERN RECOGNITION

BACKGROUND

Field of the Invention

The present invention generally relates to electronic commerce and, more particularly, to systems and methods for facilitating electronic commerce transactions using pattern recognition.

Related Art

Computer systems and networks can facilitate the tasks of buying, selling and transferring goods and services in retail and other marketplaces. For example, a consumer can pay for an item from either an online merchant or at a point of sale of a brick-and-mortar store through the use of a payment provider that can be accessed on his or her smart phone, tablet, laptop computer, desktop computer, or other personal mobile or desktop device. In particular, users of a payment provider can use the payment provider website or a payment provider application or "app" on a mobile device to make payments to various online or offline merchants.

In some cases, a user of a payment provider uses the system to make repeated payments for particular purchases such as payments to a drugstore for prescription renewals, payments for magazine, cable, internet or other subscriptions, online media purchases such as song purchases or video purchases or other purchases.

Although many systems and methods for facilitating consumer payments using a payment provider have generally worked well in the past, particularly in cases where transaction details are repeated, it would be desirable to provide improved systems and methods for faster or more convenient payment processing for consumer transactions.

Figure 1:
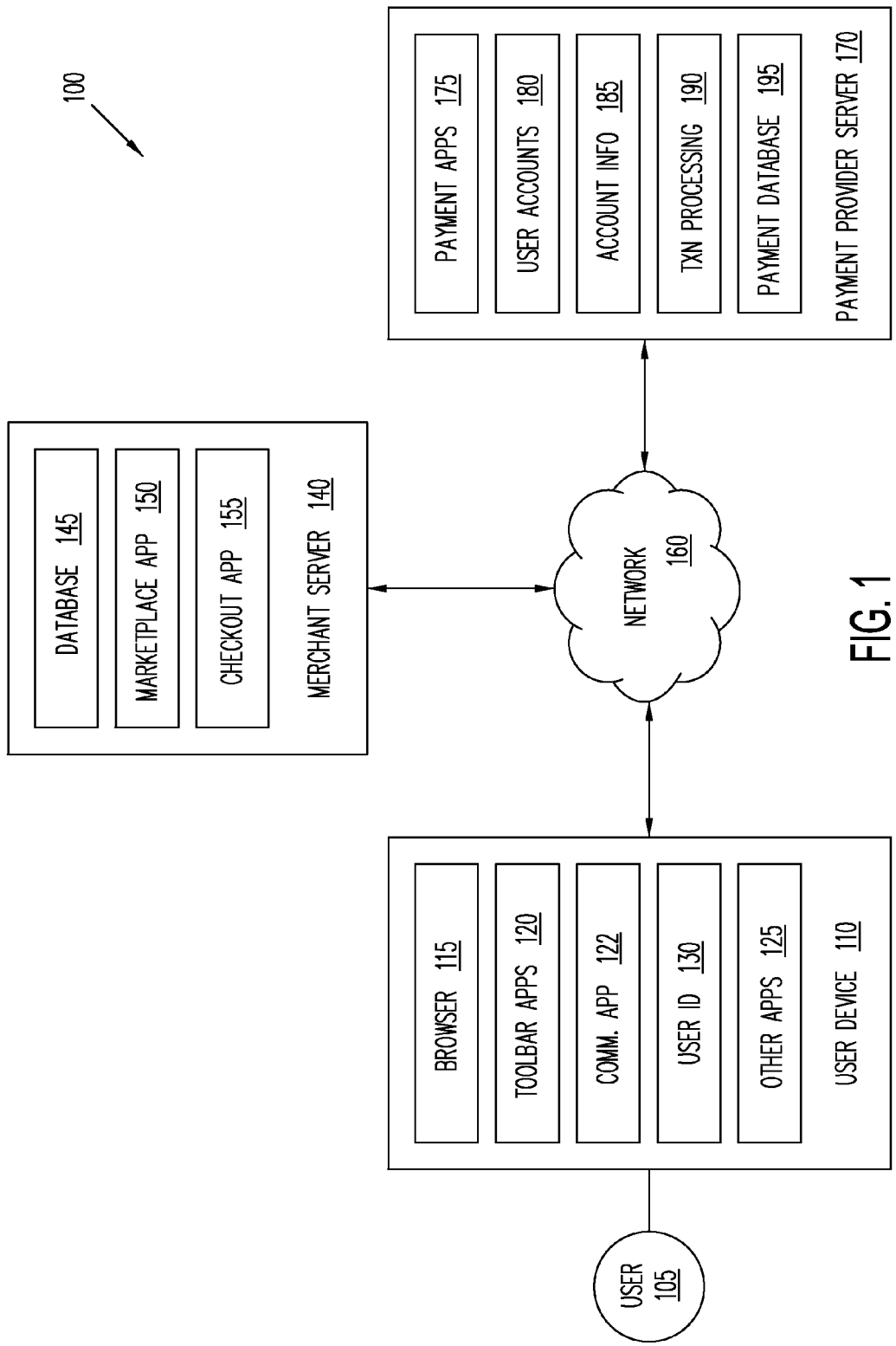
FIG. 1 is a block diagram of an illustrative networked system suitable for implementing a process for facilitating transactions using pattern recognition according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Exemplary applications of apparatuses and methods according to the present invention are described in this section. These examples are being provided solely to add context and aid in the understanding of the invention. It will thus be apparent to one skilled in the art that the present invention may be practiced without some or all of these specific details. In other instances, well known process steps have not been described in detail in order to avoid unnecessarily obscuring the present invention. Other applications are possible, such that the following examples should not be taken as limiting.

In the following detailed description, references are made to the accompanying drawings, which form a part of the description and in which are shown, by way of illustration, specific embodiments of the present invention. Although these embodiments are described in sufficient detail to enable one skilled in the art to practice the invention, it is understood that these examples are not limiting, such that other embodiments may be used, and changes may be made without departing from the spirit and scope of the invention.

Devices, systems and methods are provided for performing activities related to online transactions such as electronic commerce transactions using pattern recognition. In various particular embodiments, the devices, systems or methods can involve one or more devices in communication over a network. Such devices, systems, and methods can facilitate the execution of partially or completely online transactions using pattern recognition. According to an embodiment, drawing patterns may be created and registered by a user with a payment provider. Each registered pattern may be associated with a particular electronic commerce transaction such as a purchase transaction, a payment transaction, a sales transaction, an online auction transaction, or other transaction. The transaction can be executed when a user draws a previously registered pattern using an electronic user device such as a touch screen of a smart phone or a tablet, using a mouse or touchpad of a laptop or desktop computer, or other user input device suitable for drawing user generated patterns.

While the various examples disclosed herein focus on particular aspects regarding the online transactions, it will be understood that the various inventive principles and embodiments disclosed herein can be applied to other types of transactions and arrangements as well. For example, a purchase that is performed in person using an online payment provider for payment may utilize one or more of the aspects and features found in the various systems and methods provided.

Reference throughout the specification to "various embodiments," "some embodiments," "one embodiment," "an embodiment," "various examples," "one example," "an example," or "some examples" means that a particular feature, structure, or characteristic described in connection with the embodiment or example is included in at least one embodiment. Thus, appearances of these are not necessarily all referring to the same embodiment. Furthermore, the particular features, structures or characteristics may be combined in any suitable manner in one or more embodiments.

According to an embodiment, a computer program product can comprise a non-transitory machine readable medium. The non-transitory machine readable medium can have computer readable and executable code for instructing one or more processors to perform any of the methods disclosed herein.

Beginning with FIG. 1, a block diagram is shown of a networked system 100 suitable for implementing a process for facilitating a purchase using pattern recognition according to an embodiment. Networked system 100 may comprise or implement a plurality of servers and/or software components that operate to perform various electronic commerce transactions or processes such as payment transactions or processes. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 1 may be deployed in other ways and that the operations performed and/or the services provided by such servers may be combined or separated for a given implementation and may be performed by a greater number or fewer number of servers. One or more servers may be operated and/or maintained by the same or different entities.

System 100 may include a user device 110, a merchant server 140, and a payment provider server 170 in communication over a network 160. Payment provider server 170 may be maintained by a payment service provider, such as PayPal, Inc. of San Jose, Calif. A user 105, such as a sender or consumer, utilizes user device 110 to perform a transaction such as an electronic commerce transaction using payment provider server 170. A user 105 may utilize user device 110 to initiate a payment transaction, receive a transaction approval request, or reply to the request. Note that transaction, as used herein, refers to any suitable action performed using the user device, including payments, transfer of information, display of information, purchases, sales, online listings, etc. For example, user 105 may utilize user device 110 to initiate a deposit into a savings account. Although only one merchant server is shown, a plurality of merchant servers may be utilized if the user is purchasing products or services from multiple merchants.

User device 110, merchant server 140, and payment provider server 170 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 160.

Network 160 may be implemented as a single network or a combination of multiple networks. For example, in various embodiments, network 160 may include the Internet or one or more intranets, landline networks, wireless networks, and/or other appropriate types of networks.

User device 110 may be implemented using any appropriate hardware and software configured for wired and/or wireless communication over network 160. For example, in one embodiment, user device 110 may be implemented as a personal computer (PC), a smart phone, personal digital assistant (PDA), laptop computer, and/or other types of computing devices capable of transmitting and/or receiving data, such as an iPad™ from Apple™.

User device 110 may include one or more browser applications 115 which may be used, for example, to provide a convenient interface to permit user 105 to browse information available over network 160. For example, in one embodiment, browser application 115 may be implemented as a web browser configured to view information available over the Internet, such as a user account for setting up a shopping list and/or merchant sites for viewing and purchasing products and services. User device 110 may also include one or more toolbar applications 120 which may be used, for example, to provide client-side processing for performing desired tasks in response to operations selected by user 105. In one embodiment, toolbar application 120 may display a user interface in connection with browser application 115.

User device 110 may further include other applications 125 as may be desired in particular embodiments to provide desired features to user device 110. For example, other applications 125 may include security applications for implementing client-side security features, programmatic client applications for interfacing with appropriate application programming interfaces (APIs) over network 160, or other types of applications.

Applications 125 may also include email, texting, voice and IM applications that allow user 105 to send and receive emails, calls, and texts through network 160, as well as applications that enable the user to communicate, transfer information, make payments, and otherwise utilize a smart wallet through the payment provider as discussed above. User device 110 may include one or more user identifiers 130 which may be implemented, for example, as operating system registry entries, cookies associated with browser application 115, identifiers associated with hardware of user device 110, or other appropriate identifiers, such as used for payment/user/device authentication. In one embodiment, user identifier 130 may be used by a payment service provider to associate user 105 with a particular account maintained by the payment provider. A communications application 122, with associated interfaces, enables user device 110 to communicate within system 100.

User device 110 also may include components and applications that monitor and/or detect user-drawn patterns. For example, user device 110 may include a touch screen that displays information to user 105 and receives user input from user 105. User device 110 may monitor user input on the touch screen, on any other touch-sensitive device (e.g., a touchpad on a laptop), or using other input components (e.g., a mouse) and may recognize user generated patterns for storage, for association with transactions, and/or to activate certain functions (e.g., purchase transactions, payment transactions, sales transactions, and listing transactions). In one embodiment, user device 110 may include a camera configured to accept user inputs such as user-drawn patterns from user 105. In still another embodiment, user device 110 may include a motion detector, (e.g., a gyroscope), for detecting the motion of user device 110 itself. User device 110 may monitor the movement of user device 110 for input of any predetermined patterns made by user 105 that activate transactions.

User derive 110 also may collect location data using Global Positioning System (GPS) circuitry to identify a location of user device 110. Other means for collecting location data, such as WiFi devices, Near-Field Communication (NFC) devices, or the like also may be included in user device 110 for determining a location of user device 110. Thus, user device 110 may determine a current location of user device 110 based on the collected location data. In another embodiment, user device 110 may send the location data to payment provider server 170 and payment provider server 170 may determine a current location of user device 110 based on the location data.

Merchant server 140 may be maintained, for example, by a merchant or seller offering various products and/or services. The merchant may have a physical point-of-sale (POS) store front. The merchant may be a participating merchant who has a merchant account with the payment service provider. Merchant server 140 may be used for POS or online purchases and transactions. Generally, merchant server 140 may be maintained by anyone or any entity that receives money, which includes charities as well as banks and retailers. For example, a payment may be a donation to charity or a deposit to a bank account such as a savings account.

Merchant server 140 may include a database 145 identifying available products (including digital goods) and/or services (e.g., collectively referred to as items) which may be made available for viewing and purchase by user 105. Accordingly, merchant server 140 also may include a marketplace application 150 which may be configured to serve information over network 160 to browser 115 of user device 110. In one embodiment, user 105 may interact with marketplace application 150 through browser applications over network 160 in order to view various products, food items, or services identified in database 145.

Merchant server 140 also may include a checkout application 155 which may be configured to facilitate the purchase by user 105 of goods or services online or at a physical POS or store front. Checkout application 155 may be configured to accept payment information from or on behalf of user 105 through payment service provider server 170 over network 160. For example, checkout application 155 may receive and process a payment confirmation from payment service provider server 170, as well as transmit transaction information to the payment provider and receive information from the payment provider (e.g., a transaction ID). Checkout application 155 may be configured to receive payment via a plurality of payment methods including cash, credit cards, debit cards, checks, money orders, or the like.

Payment provider server 170 may be maintained, for example, by an online payment service provider which may provide payment between user 105 and the operator of merchant server 140. In this regard, payment provider server 170 includes one or more payment applications 175 which may be configured to interact with user device 110 and/or merchant server 140 over network 160 to facilitate the purchase of goods or services, communicate/display information, and send payments by user 105 of user device 110.

Payment provider server 170 also maintains a plurality of user accounts 180, each of which may include account information 185 associated with consumers, merchants, and funding sources, such as banks or credit card companies. For example, account information 185 may include private financial information of users of devices such as account numbers, passwords, device identifiers, user names, phone numbers, credit card information, bank information, or other financial information which may be used to facilitate online transactions by user 105. Account information may also include stored patterns that are associated with particular transactions such as payments (e.g., payments of a particular dollar amount) that may trigger the transactions when a matching pattern is provided by a user. The matching pattern may be provided by the user by drawing the pattern on a touch screen or a touchpad of user device 110, a movement of user device 110, or a gesture of user 105 captured by a camera of user device 110. Payment application 175 may be configured to interact with merchant server 140 on behalf of user 105 during a transaction with checkout application 155 to track and manage purchases made by users and which and when funding sources are used. Payment application 175 may be configured to determine the existence of and to manage accounts for user 105, as well as create new accounts if necessary. Payment application 175 may be configured to execute one or more payment transactions in response to receiving and recognizing a drawn pattern from user 105.

A transaction processing application 190, which may be part of payment application 175 or may be separate from application 175, may be configured to receive information from user device 110 and/or merchant server 140 for processing and storage in a payment database 195. Transaction processing application 190 may include one or more applications for processing information from user 105 for processing an order and for payment using various selected funding instruments, including operations for initial purchase and for payment after purchase as described herein. As such, transaction processing application 190 may store details of an order from individual users, including a funding source used, available credit options, etc. Transaction processing application 190 may be configured to execute one or more transactions such as electronic commerce transactions in response to receiving and recognizing a drawn pattern from user 105.

One or more of merchant server 140, payment provider server 170, and user device 110 may be used to execute any suitable transaction in response to receiving and recognizing a drawn pattern from a user. As examples, in response to receiving and recognizing a drawn pattern any or all of merchant server 140, payment provider server 170, and user device 110 may execute a payment of a particular dollar amount from a particular funding source to a particular merchant, may list for sale a product at a particular price for a particular time period on a merchant website, may initiate delivery of a purchased item from a seller, may accept an offer from a potential buyer, may alter details of a currently listed product for sale, or may execute any other suitable transaction performed partially or completely online.

In one particular situation that is sometimes discussed herein as an example, a user may input a predetermined or pre-registered pattern to user device 110 that is provided to payment provider server 170 and that, when recognized by server 170, executes, for example, a payment to a particular merchant, of a particular amount, from a particular funding source. The particular merchant, the particular amount, and the particular funding source may have been previously associated with the recognized pattern during pattern registration operations performed by the user.

Figure 2:
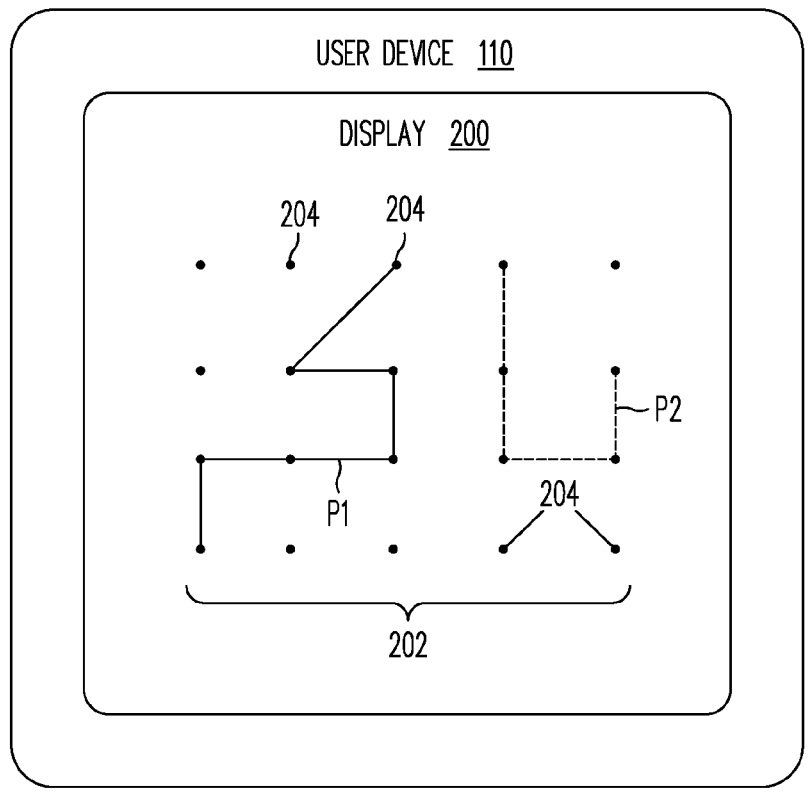
FIG. 2 is a diagram of an illustrative user device having a display showing how a user may be provided with the ability to create a pattern according to an embodiment.

FIG. 2 shows an example of a user device having a display that is performing pattern registration operations in cooperation with, for example, a payment provider server in accordance with an embodiment. As shown in FIG. 2, a user device 110 may have a display 200 such as touchscreen display. During pattern registration operations, the display may be instructed (e.g., by a payment provider app or payment provider website) to display an image such as pattern entry image 202 that can be used for pattern entry by a user. In the example of FIG. 2, image 202 is an N by M matrix of dots 204. However, this is merely illustrative. If desired, any suitable image such as a user-provided image (e.g., a digital photograph that has been uploaded by the user) may be provided on display 200 for pattern entry.

During pattern registration operations, the user may draw one or more patterns such as pattern P1 or pattern P2 (as examples) on the image 202. The image 202 may be used to facilitate the drawing of the pattern by the user (e.g., by providing a visual guide for the user's finger) and may also facilitate the drawing of more easily recognized patterns for later recognition by, for example, a payment provider. The example of FIG. 2 shows an N=4 by M=5 dot matrix. However, this is merely illustrative. It should be appreciated that a matrix having any numbers N and M of respective rows and columns of dots may be provided or any other image may be provided. In one embodiment, the user may be provided with the ability to choose the numbers N and M of respective rows and columns of dots to be provided in the pattern entry image.

Once a particular pattern (e.g., pattern P1, pattern P2, a discontinuous pattern that includes both patterns P1 and P2, or any other continuous or discontinuous pattern) has been drawn by the user, the pattern may be saved (e.g., using memory or other storage on user device 110 or payment provider sever 170) and the user may be prompted to associate that saved pattern with a particular transaction such as an electronic commerce transaction.

The location of the drawn pattern on the pattern entry image 202 may also be stored so that the same pattern drawn in different locations on the image can be associated with different transactions (e.g., payments of different amounts) or so that a pattern entered at the wrong position on the image can be blocked from authorizing the transaction.

Figure 3:
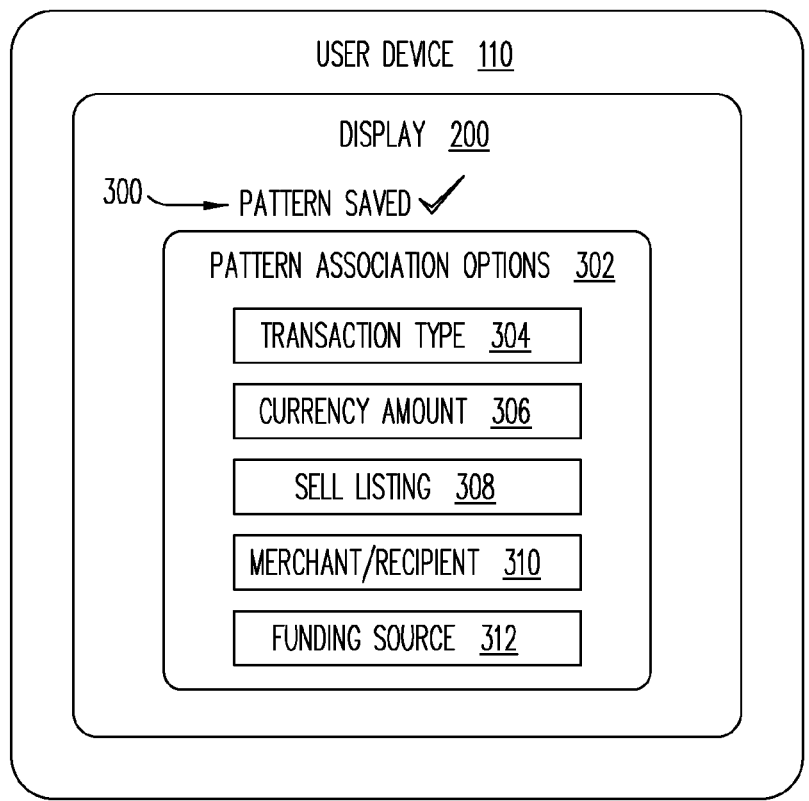
FIG. 3 is a diagram of an illustrative user device having a display showing how a user may be provided with the ability to register a created pattern by associating the pattern with a particular transaction according to an embodiment.

FIG. 3 shows an example of a user device having a display that is performing pattern registration operations in cooperation with, for example, a payment provider server in accordance with an embodiment. As shown in FIG. 3, display 200 may provide a user with an indicator 300 that indicates that a drawn pattern has been successfully saved. In addition to indicator 300, the user may be provided with one or more pattern association options 302 that can be associated with the saved pattern.

Pattern association options 302 may include a transaction type option 304, a currency amount option 306, a sell listing option 308, a merchant/recipient option 310, a funding source option 312, and/or other suitable transaction options that can be associated with a pattern. Transaction type option 304 may include an option to associate a particular saved pattern with an electronic commerce transaction (e.g., a purchase transaction, a sales transaction, a payment transaction, a payment request transaction, an invoicing transaction, or other online financial transaction) or another type of transaction. Currency amount option 306 may include an option for determining a payment amount, a selling price, a minimum selling price, a purchase price range, or other price-related options to be associated with the saved pattern. Currency amount option 306 may be specified in dollars, euros, or any other suitable currency. Sell listing options 308 may include options for listing items for sale on, for example, an auction website. Listing option 308 may include options for immediately listing a particular item, an auction end time option for an item, a standard description option for an item, a number of items option for a listing, or other listing options that can be associated with a saved pattern. Merchant/recipient option 310 may include an option to associate a particular saved pattern with a particular merchant or any other particular recipient. Recipients of payments, payment requests, and or invoices (as examples) may be identified by a recipient account at the payment provider or by other identifying information such as an email address or a telephone number at which the recipient can receive payments, instructions for receiving payments, payment requests, and/or invoices (as examples). A recipient may be a recipient of a payment or a payer that receives payment requests and/or invoices according to some embodiments.

Each saved pattern can be associated with one or more non-conflicting options from options 302 that specify transaction details for a particular transaction. In various embodiments, a pattern may be used to make a payment of a specific amount to any recipient or a payment of any amount to a specific recipient. For example, a particular pattern may always be used to make payments of $100. In another example, a particular pattern may be used to make payments to a friend at a particular email address. In another embodiment, a pattern such as pattern P1 of FIG. 2 may be associated with a transaction for payment of an amount such as $100 to a seller from whom the user has purchased a product (e.g., in an online auction website such as an eBay, Inc. website, or another merchant website) from a particular funding source of the user that is associated with a stored user account. As another example, a pattern such as pattern P2 of FIG. 2 may be associated with a transaction of listing an item that is currently displayed on the user device display in a 10-day online auction with a minimum selling price of $102 and with an option to receive payment through a particular payment provider such as PayPal, Inc. of San Jose, Calif. It should be appreciated that these examples and embodiments are merely illustrative.

In various embodiments, any suitable pattern that can be drawn by a user can be associated with any suitable transaction. In various embodiments, options 302 can be provided to a user on a webpage associated with a payment provider server, on a app that communicates with a payment provider server, or on an app that resides completely on a user device (as examples). Saved patterns and associated transaction options can be stored on the user device, on the payment server, or elsewhere in an online transaction system.

In one embodiment, the pattern to be saved can be entered after the pattern association options have been selected. For example, a user may execute a transaction such as a payment without using any pattern recognition operations and, following that transaction, the user can be provided with the option to create a pattern to associate with that transaction. In some embodiments, a payment provider can provide the user with the option to create a pattern after detecting that the user has repeatedly (e.g., more than once, more than twice, more than three times, etc.) executed the same transaction (e.g., a payment of the same amount from the same funding source to the same merchant).

Figure 4:
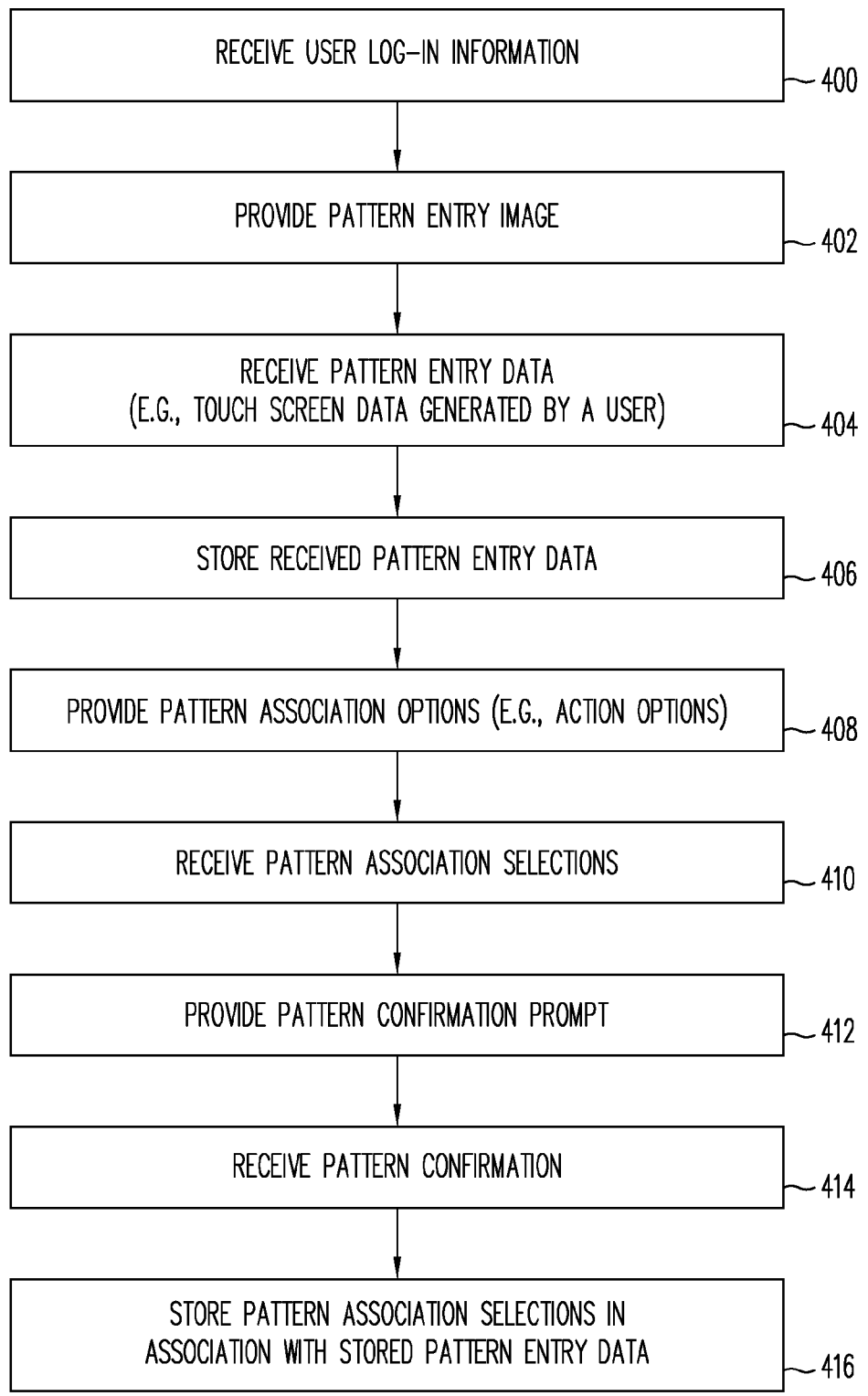
FIG. 4 is a flowchart showing an illustrative process for generating user transaction patterns for facilitating transactions according to an embodiment.

FIG. 4 is a flowchart showing illustrative operations in a process for creating and registering a pattern according to one embodiment.

At step 400, user log-in information such as a username and a password may be received (e.g., at a payment provider server from a user device).

At step 402, a pattern entry image of the type shown in FIG. 2 may be provided to a user. The pattern entry image may be provided by, for example, a payment provider server 170. The pattern entry image may be displayed to the user on a user device display. As described herein, the pattern entry image may be a grid (matrix) of N×M dots, a user-provided image, or any other suitable image on which a pattern can be drawn.

At step 404, pattern entry data may be received (e.g., from a user entering a pattern on a user device). The pattern entry data may be touchscreen data generated by a user drawing a pattern on a touchscreen of the user device over the pattern entry image according to an embodiment. According to other embodiments, the pattern entry data may be mouse-generated data generated by a user drawing a pattern by moving a cursor that is displayed on a touch or non-touch display over the pattern entry image.

At step 406, the received pattern entry data may be stored (e.g., using memory associated with the user device or memory associated with the payment provider server).

At step 408, pattern association options of the type shown in FIG. 3 may be provided to the user. As described above in connection with FIG. 3, pattern association options may include transaction type options, currency amount options such as price options, listing options, merchant/recipient options, or other transaction options.

At step 410, pattern association selections may be received (e.g., from the user device). Receiving the pattern association selections may include receiving user-selected ones of the provided pattern association options that specify a set of transaction details from the user to be associated with the pattern. The set of transaction details may define an action such as an electronic commerce transaction to be performed when the pattern is later received by the payment provider. For example, a payment provider server may receive data (e.g., tapped touchscreen data or typed real or virtual keyboard data) that indicates that a user has selected a set of transaction details for a particular type of future transaction (e.g., an action resulting in a payment in the amount of $60 to a grocery store merchant from a bank account).

At step 412, a pattern confirmation prompt may be provided. The pattern confirmation prompt may include an option for a user to confirm the association of the pattern association selections with the pattern.

At step 414, a pattern confirmation may be received (e.g., from the user device).

At step 416, the pattern association selections may be stored in association with the stored pattern entry data (e.g., on memory of a payment provider server, memory of a user device or other hardware memory system storage). In this way, a user may register a pattern by saving the pattern and storing specific transaction actions to be taken when the user later enters the pattern again.

In general, the steps described above in connection with FIG. 4 may be performed in any suitable order and/or combined in any suitable way for creating and registering patterns to be used in transaction operations involving pattern recognition.

Stored patterns that have been registered can be used by the user to make payments, to purchase items for sale, to sell items, or to perform other transactions.

In various embodiments, user may utilize pre-registered patterns to execute various transactions such as payments, requests for payment, invoice generation, product purchase and/or item listing (as examples).

Figure 5:
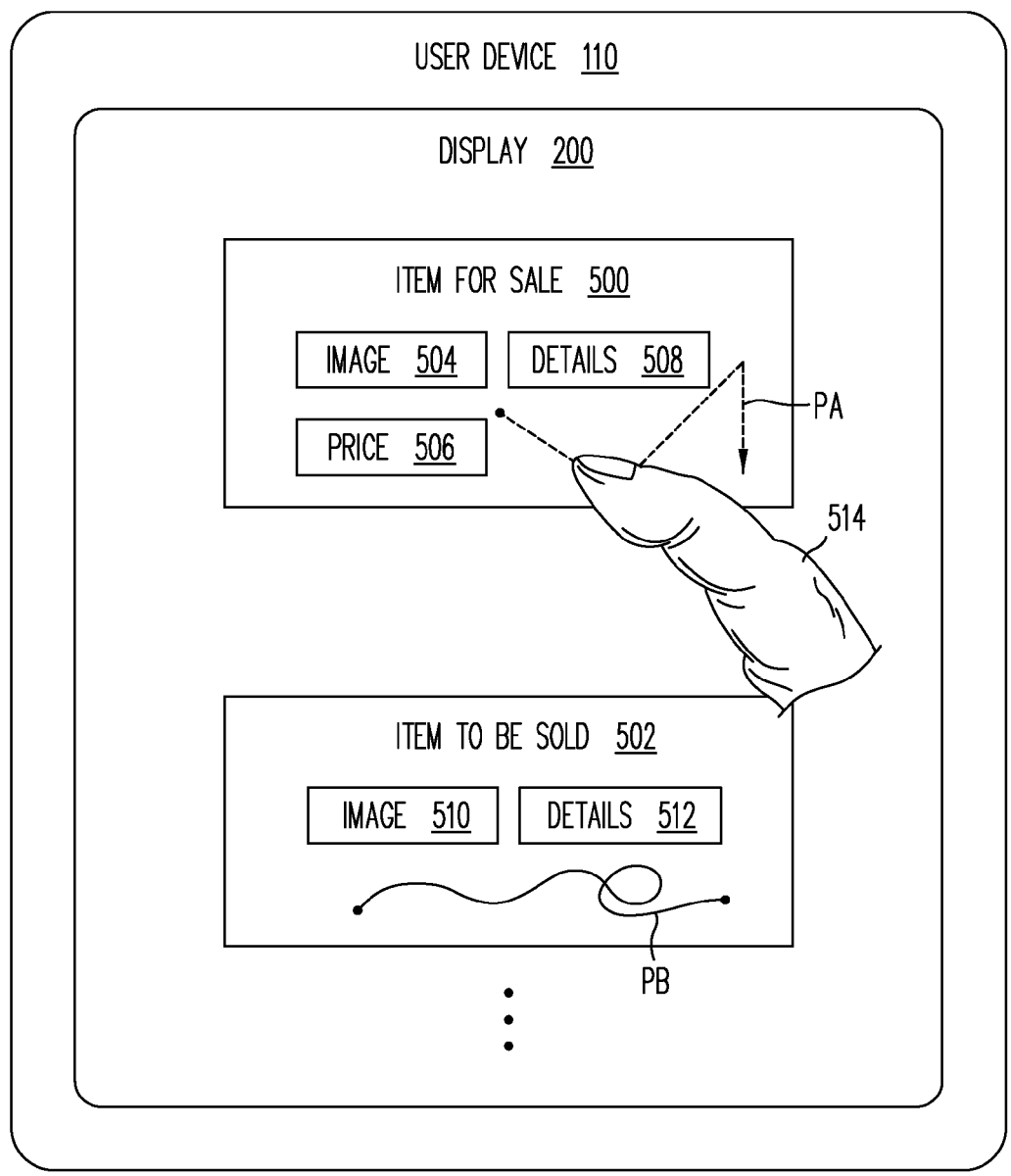
FIG. 5 is a diagram of an illustrative user device having a display showing how a user may execute a purchase and payment transaction by drawing a previously registered pattern on the display according to an embodiment.

FIG. 5 shows an example of a user device having a display that is performing product purchase and item listing transactions in response to user-drawn patterns in cooperation with, for example, a payment provider server in accordance with an embodiment. As shown in FIG. 5, display 200 may be used to provide a user with an item for sale 500 and/or an item to be sold 502. An item for sale 500 may be listed, for example, on a merchant webpage. Item for sale 500 may include information about the item such as an image 504 of the item, a purchase price 506 for the item, and/or item details 508 (e.g., text or image descriptions of item specifications and/or seller details). Item to be sold 502 may include identifying information that has been provided by the user or by a previous seller such as an image 510 of the item and item details 512.

As shown in FIG. 5, a user may use an entry device such as the user's finger 514 to draw a pattern PA on the display 200 (e.g., a touchscreen display) or may draw the pattern PA using another device (e.g., a mouse). The pattern PA may be drawn partially or completely over the item for sale or the pattern PA may be drawn elsewhere on the display. In some embodiments, the success, failure, or type of transaction that is performed in response to a drawn pattern may depend on the location on the display at which the pattern was drawn. The pattern PA may be a pre-registered pattern that the user has already stored with options to purchase an item for the price from the seller using a particular funding source (e.g., a credit card or a payment account with a payment provider) according to an embodiment. The user may thereby automatically purchase the item for sale 500 by drawing the pattern PA over the item for sale according to an embodiment.

As another example, a user may use an entry device such as the user's finger 514 or a mouse to draw another pattern such as pattern PB on the display 200 to sell an item such as item to be sold 502. The pattern PB may be drawn partially or completely over the item to be sold or the pattern PB may be drawn elsewhere on the display. The pattern PB may be a pre-registered pattern that the user has already stored with options to list an item for sale for a predetermined price or price range on a particular merchant server with particular payment acceptance method (for example). The user may thereby automatically list the item to be sold 502 by drawing the pattern PB over the item to be listed according to an embodiment.

Although the user device 110 of FIG. 5 is shown to be the same device that was used to enter and register the pattern, it should be appreciate that this is merely illustrative. In accordance with various embodiments, the user device that is used to create and register patterns can be the same or different from a user device that is used to execute transactions using the patterns.

In the example of FIG. 5, patterns PA and PB are entered without the presentation to the user of the pattern entry image that was used when registering the respective patterns. However, this is merely illustrative. In some embodiments, the pattern entry image may be provided to the user so that the user can enter the pattern at the appropriate location on the image for execution of a transaction.

Figure 6:
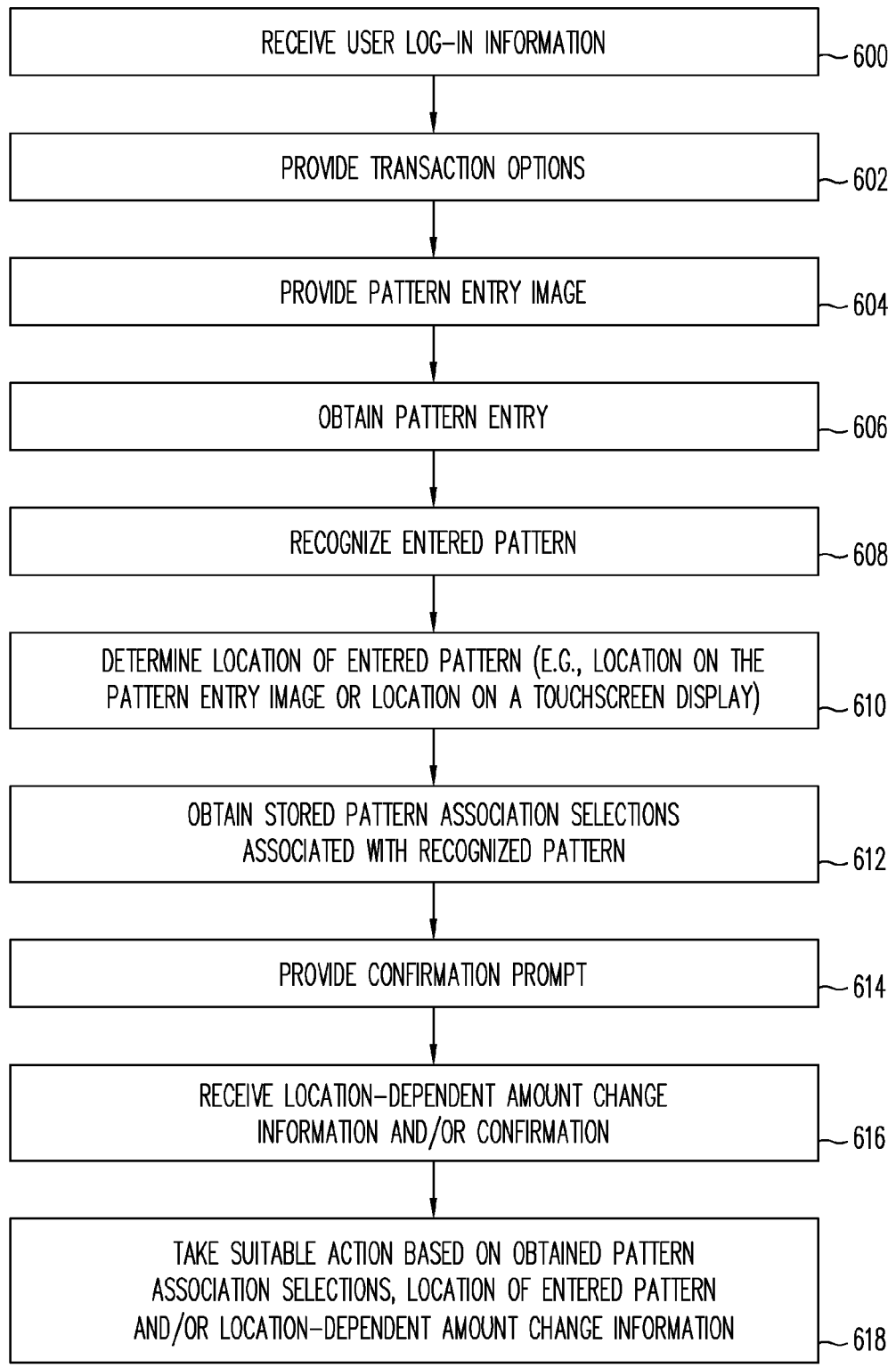
FIG. 6 is a flowchart showing an illustrative process for executing a transaction for a user using pattern recognition according to an embodiment.

FIG. 6 is a flowchart showing a process for executing transactions such as electronic commerce transactions using pattern recognition according to an embodiment.

At step 600, user log-in information such as a username and a password may be received (e.g., at a payment provider server from a user device).

At step 602, transaction options may be provided to a user. The transaction options may be items for sale, items to be listed for sale, payment options, payment request options, invoicing options, or other electronic commerce transaction options (as examples). The transaction options can be provided on a merchant website, on an auction website, or in a user application running on a user device. In some embodiments, step 602 may be omitted if the user has registered patterns that specify all of the necessary information for executing a transaction.

At step 604, a pattern entry image may be provided. The pattern entry image may be a pattern entry image that was provided to the user when the user registered one or more patterns. The pattern entry image may, if desired, be selected by the user from multiple pattern entry images.

At step 606, a pattern entry may be obtained. Obtaining a pattern entry may include receiving touchscreen data generated by a user when the user draws a pattern on the provided pattern entry image using a touchscreen of a user device. However, this is merely illustrative. The pattern entry may be obtained by any means through which a user can draw a pattern. In another example, the user may move a mouse or other device in a way that generates data representing a user-drawn pattern on a provided pattern entry image.

At step 608, the entered pattern may be recognized (e.g., by the payment processor server or by the user device). Recognizing the pattern may include mapping received pattern entry data such as touchscreen data to a data format that matches the format in which previously registered patterns have been stored, comparing the entered pattern to one or more previously registered patterns, and matching the entered pattern to a previously registered pattern based on the comparison according to various embodiments.

At step 610, the location of the entered pattern may be determined Determining the location of the entered pattern may include determining the location on the pattern entry image and/or the location on the touchscreen display at which the pattern was entered.

At step 612, stored pattern association selections that are associated with the recognized pattern may be obtained (e.g., from storage such as memory associated with a payment provider server or a user device on which the pattern association selections have been stored in association with registered, saved patterns). The pattern association selections may be, for example, pattern association selections of the type described herein in connection with FIG. 3.

At step 614, a confirmation prompt may optionally be provided that allows the user to confirm or cancel a transaction associated with the recognized pattern, the determined location, and the stored pattern association selections.

At step 616, location-dependent amount change information and/or a confirmation may be received. In one embodiment, the user may tap various locations on a touchscreen to adjust the amount of a payment associated with a recognized pattern (e.g., by tapping a top portion of the display to increment amount by, for example, $5 or by tapping on a bottom portion of the display to decrease amount by for example, $5). In another embodiment, a confirmation of the transaction may be received without any location-dependent amount change information. In another embodiment, the transaction may be executed without an additional confirmation or any location-dependent amount change information.

At step 618, a transaction may be completed by taking suitable action based on the obtained pattern association selections, the location of the entered pattern, and/or the location-dependent amount change information. Suitable action may include sending a payment of an amount to a merchant or a recipient from a funding source as determined by the pattern association selections, listing an item for sale as determined by the pattern association selections, requesting a payment as determined by the pattern association selections, or performing other operations for transactions defined by the obtained pattern association selections. In this way, a user can perform a particular online transaction such as making a payment by providing a particular associated pattern.

In general, the steps described above in connection with FIG. 6 may be performed in any suitable order and/or combined in any suitable way for executing transaction operations involving pattern recognition.

Figure 7:
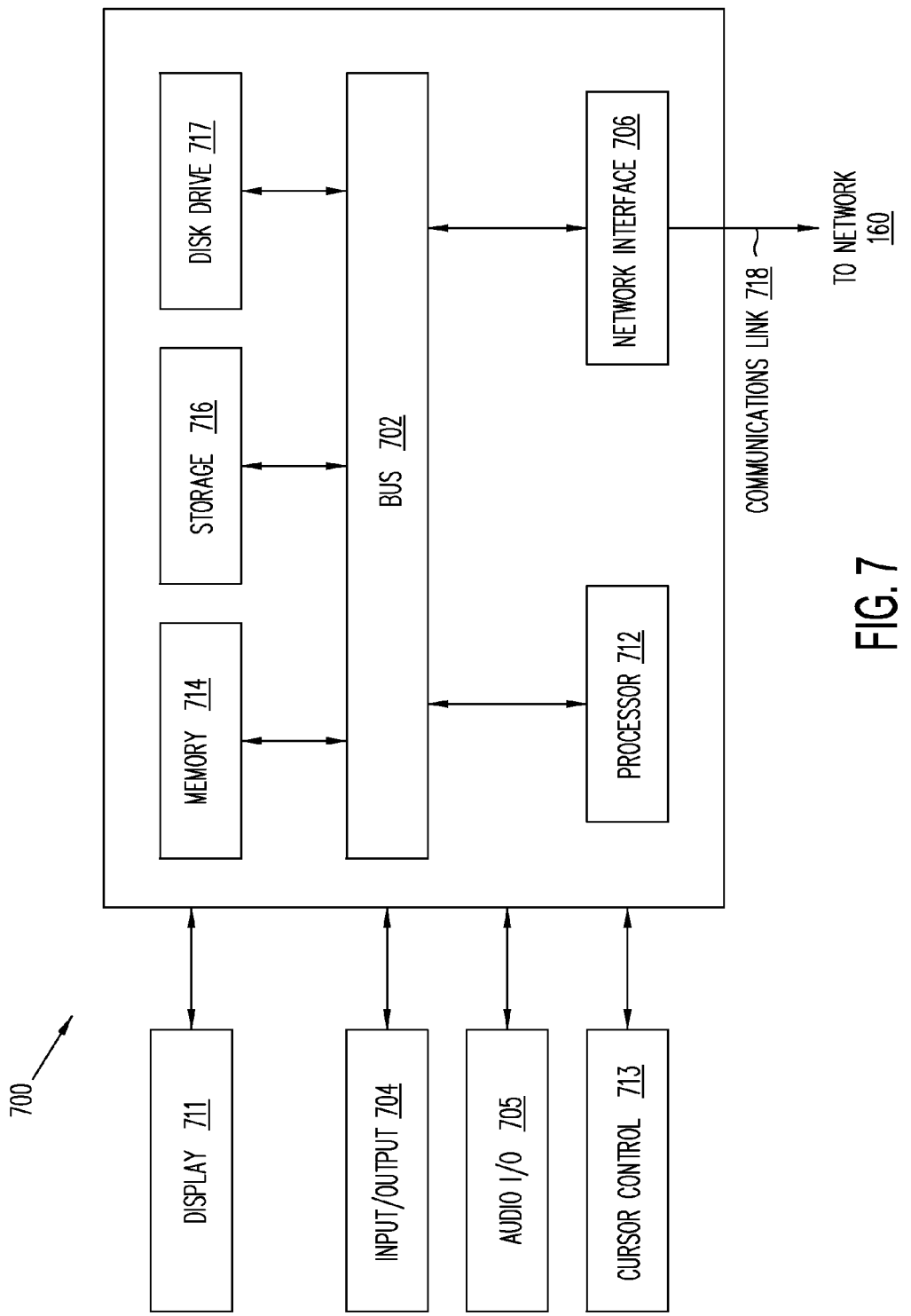
FIG. 7 is a block diagram of an illustrative computer system suitable for implementing one or more components in FIG. 1 according to an embodiment.

FIG. 7 is a block diagram of a computer system 700 suitable for implementing one or more embodiments of the present disclosure. In various implementations, the user device may comprise a personal computing device (e.g., smart phone, a computing tablet, a personal computer, laptop, PDA, Bluetooth device, key FOB, badge, etc.) capable of communicating with the network. The merchant and/or payment provider may utilize a network computing device (e.g., a network server) capable of communicating with the network. It should be appreciated that each of the devices utilized by users, merchants, and payment providers may be implemented as computer system 700 in a manner as follows.

Computer system 700 includes a bus 702 or other communication mechanism for communicating information data, signals, and information between various components of computer system 700. Components include an input/output (I/O) component 704 that processes a user action, such as selecting keys from a keypad/keyboard, selecting one or more buttons or links, etc., and sends a corresponding signal to bus 702. I/O component 704 may also include an output component, such as a display 711 and a cursor control 713 (such as a keyboard, keypad, mouse, etc.). An optional audio input/output component 705 may also be included to allow a user to use voice for inputting information by converting audio signals. Audio I/O component 705 may allow the user to hear audio. A transceiver or network interface 706 transmits and receives signals between computer system 700 and other devices, such as another user device, a merchant server, or a payment provider server via network 160. In one embodiment, the transmission is wireless, although other transmission mediums and methods may also be suitable. A processor 712, which can be a microcontroller, digital signal processor (DSP), or other processing component, processes these various signals, such as for display on computer system 700 or transmission to other devices via a communication link 718. Processor 712 may also control transmission of information, such as cookies or IP addresses, to other devices.

Components of computer system 700 also include a system memory component 714 (e.g., RAM), a static storage component 716 (e.g., ROM), and/or a disk drive 717. Computer system 700 performs specific operations by processor 712 and other components by executing one or more sequences of instructions contained in system memory component 714. Logic may be encoded in a computer readable medium, which may refer to any medium that participates in providing instructions to processor 712 for execution. Such a medium may take many forms, including but not limited to, non-volatile media, volatile media, and transmission media. In various implementations, non-volatile media includes optical or magnetic disks, volatile media includes dynamic memory, such as system memory component 714, and transmission media includes coaxial cables, copper wire, and fiber optics, including wires that comprise bus 702. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 700. In various other embodiments of the present disclosure, a plurality of computer systems 700 coupled by communication link 718 to the network (e.g., such as a LAN, WLAN, PTSN, and/or various other wired or wireless networks, including telecommunications, mobile, and cellular phone networks) may perform instruction sequences to practice the present disclosure in coordination with one another.

Figure 8:
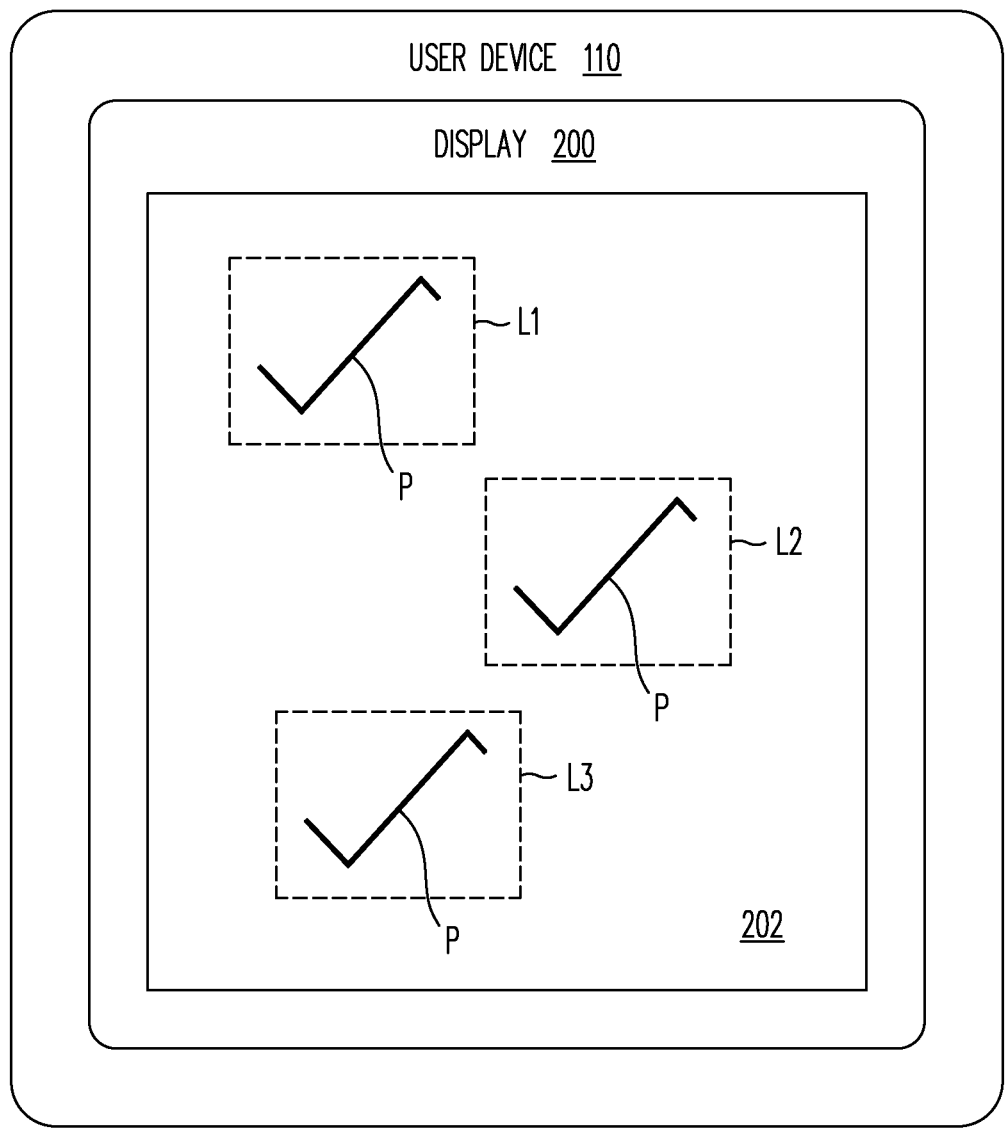
FIG. 8 is a diagram of an illustrative user device having a display showing how a user may execute particular transactions by drawing a previously registered pattern at various corresponding locations on the display according to an embodiment.

As described herein, action associated with a particular registered pattern may depend on the location at which that pattern is entered. FIG. 8 is a diagram of a user device 110 showing how a particular pattern P may be entered at various locations such as locations L1, L2, and/or L3 on a pattern input image 202. Pattern P may be a pre-registered pattern. In one embodiment, a pattern P drawn by the user on display 200 at location L1 may execute a payment of $100 to a recipient, a pattern P drawn by the user on display 200 at location L2 may execute a payment of $50 to the recipient, and a pattern P drawn by the user on display 200 at location L3 may execute a payment of $20 to the recipient. However, this is merely illustrative. In various embodiments, any suitable pattern at any suitable location can be associated with any suitable transaction.

Figure 9:
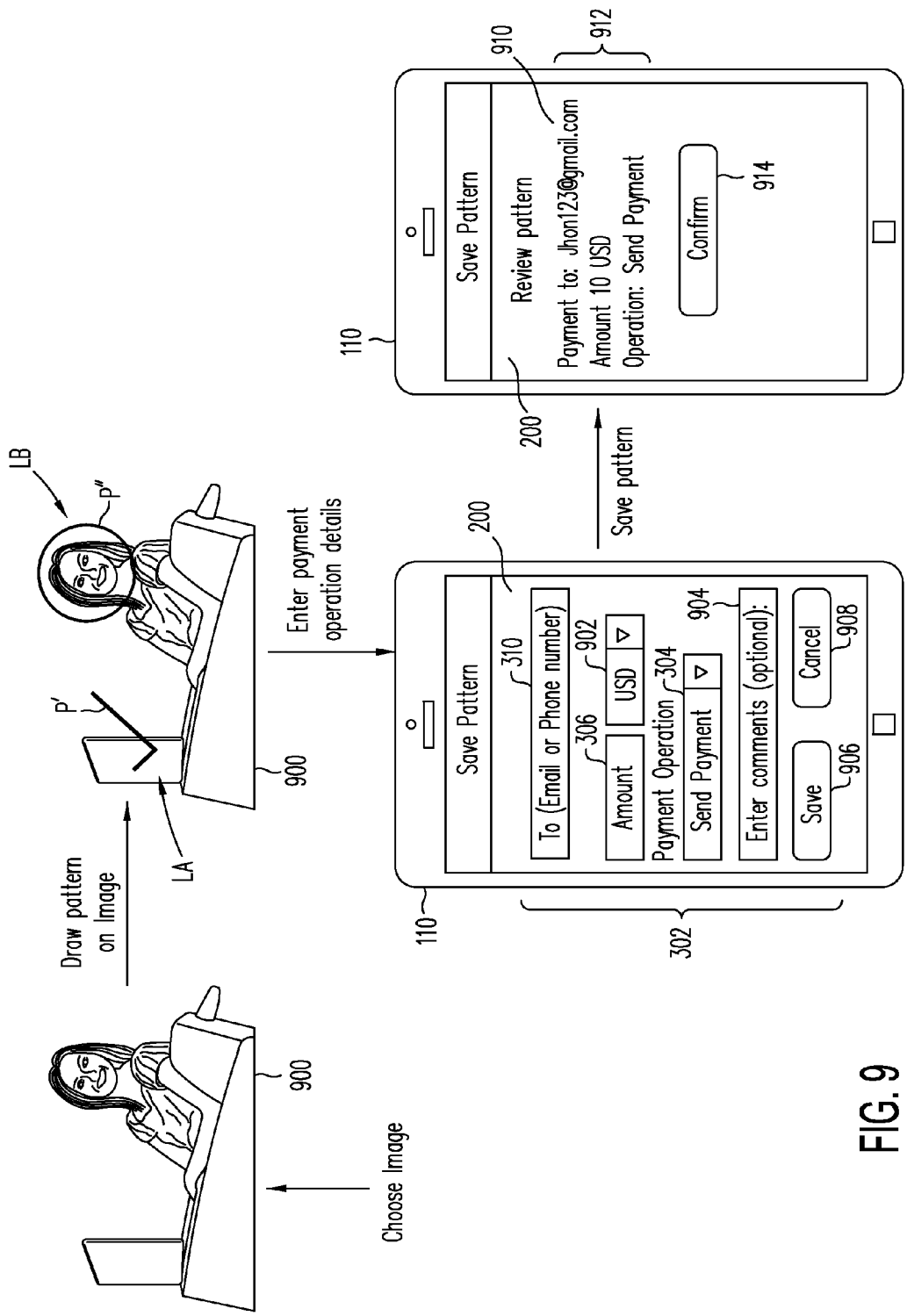
FIG. 9 is a flow diagram showing an illustrative process for registering a pattern using a user-provided pattern entry image on a mobile device according to an embodiment.

FIG. 9 is a flow diagram showing how a user may register patterns at specific locations on a pattern entry image for association with a payment transaction in accordance with an embodiment. As shown in FIG. 9, a user may choose a pattern entry image such as image 900, draw one or more patterns such as patterns P' and P'' on the image at respective locations LA and LB, enter payment operation details (e.g., pattern association selections), and save the pattern. Patterns P' and P'' may be individual patterns to be registered or may be portions of one discontinuous pattern to be registered.

As shown in FIG. 9, pattern association options 302 may be provided on a display 200 of a user device 110 that is implemented as a smart phone such as an iPhone® of Apple, Inc. Options 302 such as merchant/recipient option 310, currency amount option 306, currency type option 902, transaction type option 304, and additional comments option 904 may be provided in a pattern registration app. As shown, options 302 may be provided as text entry options (e.g., options 310, 306, and 904) and/or drop-down menu options (e.g., options 304 and 902). In some embodiments, additional options such as save option 906 for saving pattern association selections and cancel option 908 for canceling pattern registration may also be provided. In some embodiments, a pattern registration confirmation page 910 may be provided having a confirmation option 914 that can be selected by the user to confirm the pattern registration. Pattern association selections such as selections 912 may be provided to the user for confirmation. Once a pattern has been registered, the user can later use a pattern drawing application to execute a transaction such as a payment.

Figure 10:
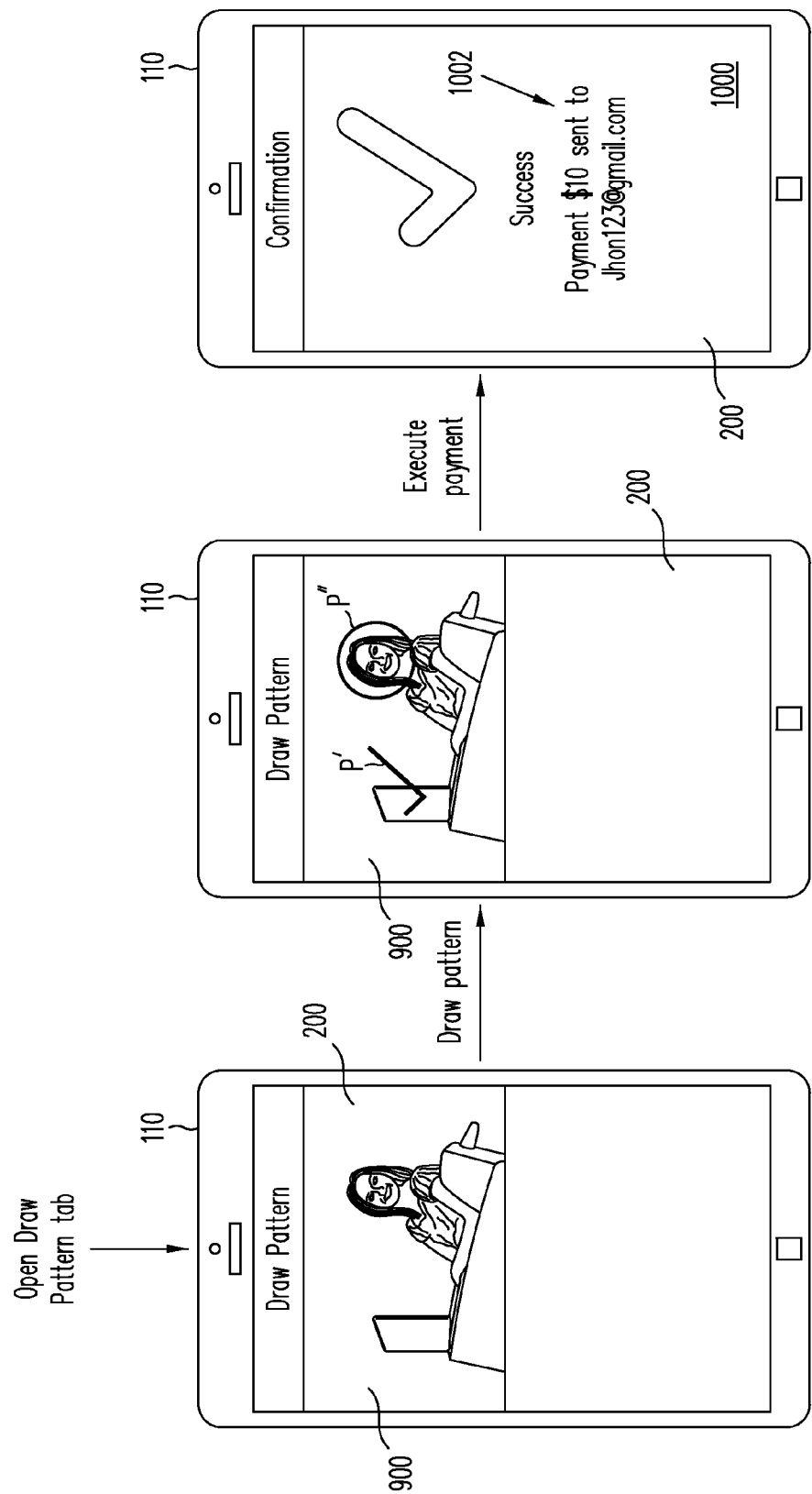
FIG. 10 is a flow diagram showing an illustrative process for executing a payment action using a user-provided pattern entry image on a mobile device according to an embodiment.

FIG. 10 is a flow diagram showing how a user may execute a payment by drawing previously registered patterns P' and P'' on pattern entry image 900. As shown, the user may open a draw pattern tab in, for example, a payment provider application on a smartphone, be provided with pattern entry image 900, and draw patterns P' and P'' at the appropriate locations on pattern entry image 900, thereby executing a payment as determined by selections 912 of FIG. 9. After payment execution, the user may be provided with a confirmation screen 1000 on which details 1002 matching options 912 are provided.

Figure 11:
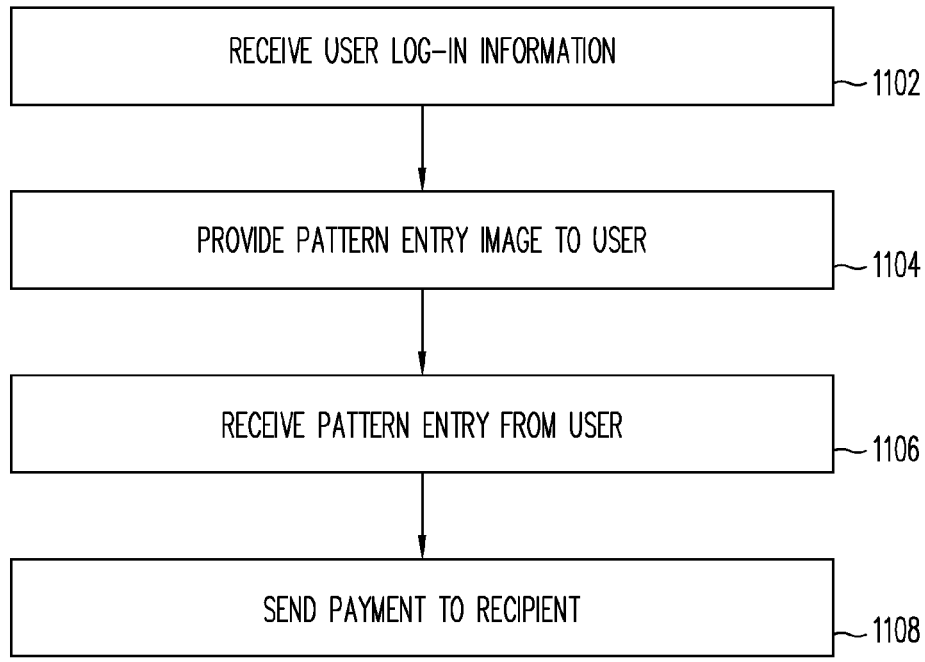
FIG. 11 is a flowchart showing an illustrative process for executing a payment using a pattern entry image according to an embodiment.
Figure 12:
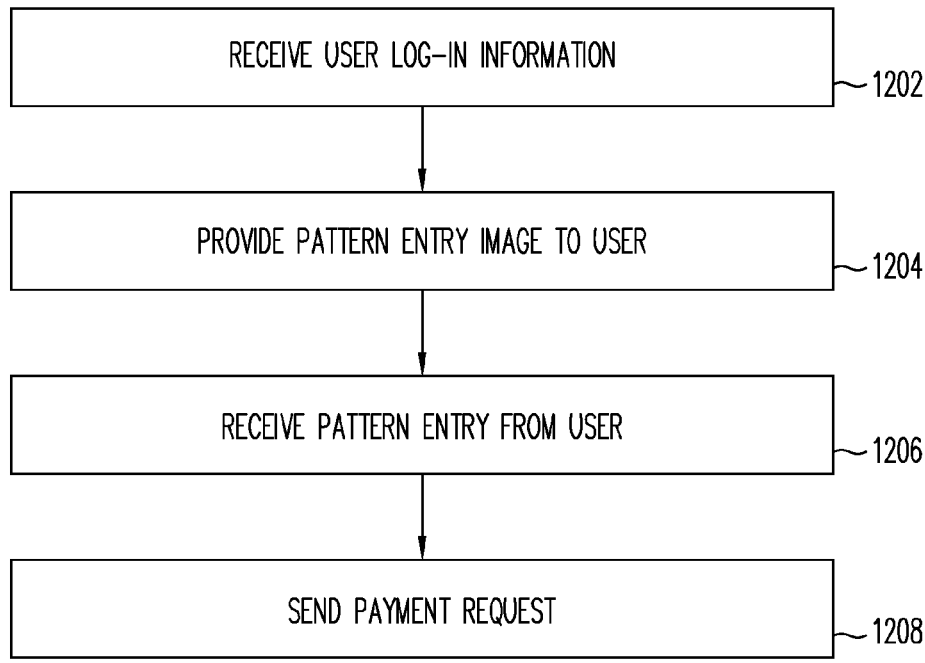
FIG. 12 is a flowchart showing an illustrative process for sending a payment request using a pattern entry image according to an embodiment.
Figure 13:
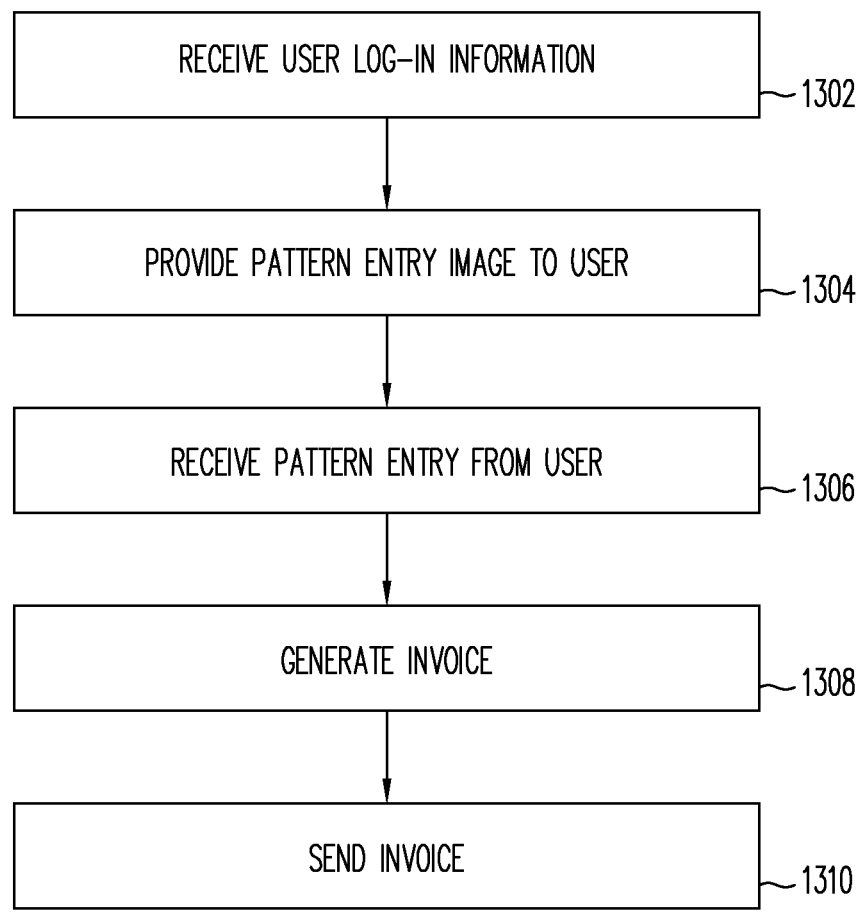
FIG. 13 is a flowchart showing an illustrative process for generating and sending an invoice using a pattern entry image according to an embodiment.

FIGS. 11, 12, and 13 are flowcharts showing illustrative processes for executing respectively a payment, a payment request, and an invoice transaction by entering a pre-registered pattern on a provided pattern entry image.

Referring now to FIG. 11, a process for executing a payment is shown.

At step 1102, user log-in information such as a username and a password may be received (e.g., at the payment provider server from a user device).

At step 1104, a pattern entry image that was previously used when registering one or more patterns may be provided to the user.

At step 1106, a pattern entry may be received from the user. The pattern entry may be received when the user draws a pre-registered pattern on the provided pattern entry image at, for example, a particular location.

At step 1108, in response to receiving the pattern entry, a payment may be sent to a recipient as determined by the pre-registered pattern.

Referring now to FIG. 12, a process for executing a payment request is shown.

At step 1202, user log-in information such as a username and a password may be received (e.g., at the payment provider server from a user device).

At step 1204, a pattern entry image that was previously used when registering one or more patterns may be provided to the user.

At step 1206, a pattern entry may be received from the user. The pattern entry may be received when the user draws a pre-registered pattern on the provided pattern entry image at, for example, a particular location.

At step 1208, in response to receiving the pattern entry, a payment request may be sent to a recipient as determined by the pre-registered pattern.

Referring now to FIG. 13, a process for generating and sending an invoice is shown.

At step 1302, user log-in information such as a username and a password may be received (e.g., at the payment provider server from a user device).

At step 1304, a pattern entry image that was previously used when registering one or more patterns may be provided to the user.

At step 1306, a pattern entry may be received from the user. The pattern entry may be received when the user draws a pre-registered pattern on the provided pattern entry image at, for example, a particular location.

At step 1308, in response to receiving the pattern entry data, an invoice may be generated as determined by the pre-registered pattern.

At step 1310, the invoice may be sent to a recipient as determined by the pre-registered pattern.

Figure 14:
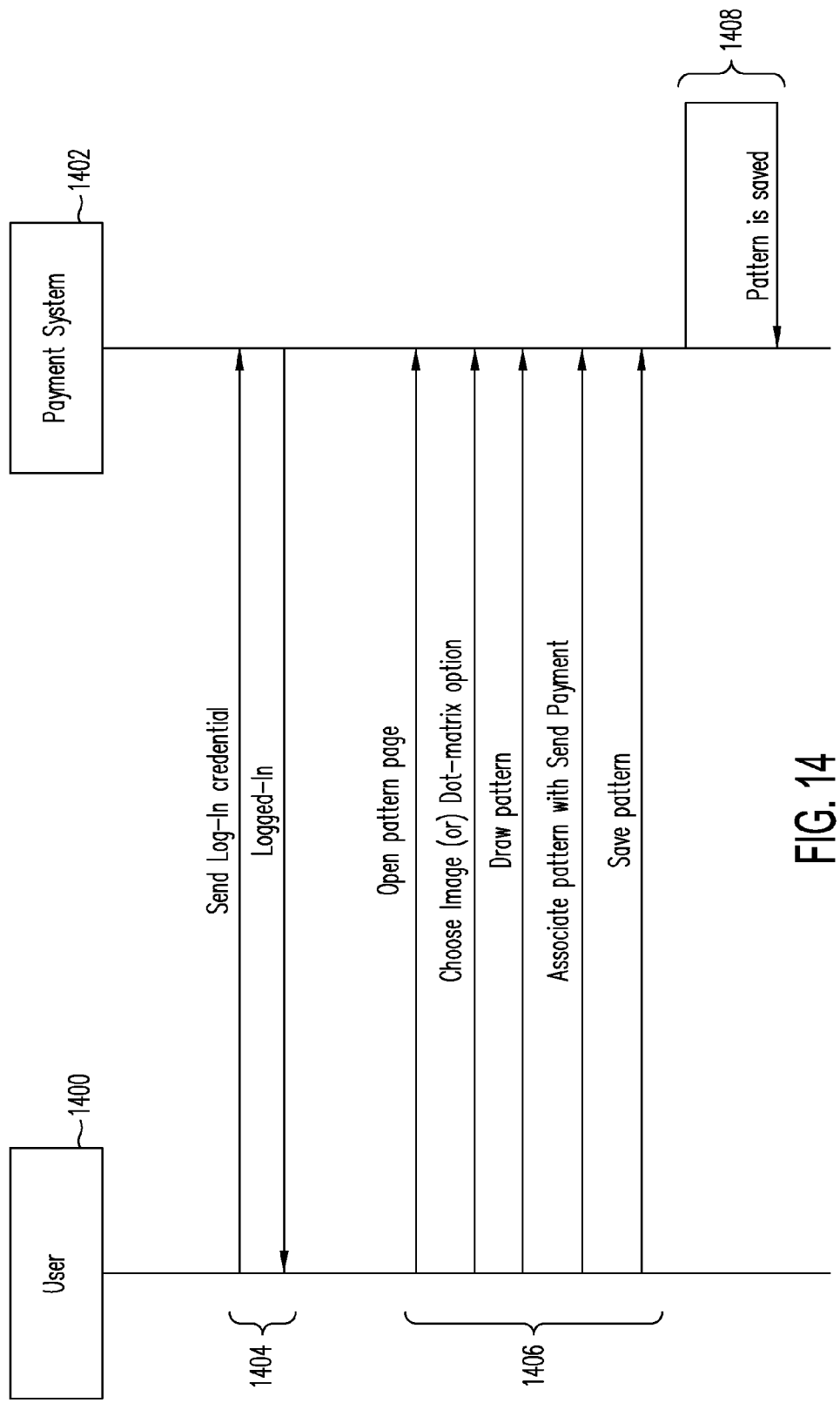
FIG. 14 is a diagram of illustrative communications between a user and a payment system during pattern registration operations according to an embodiment.

FIG. 14 is a diagram of illustrative communications between a user and a payment system during pattern registration operations according to an embodiment. As shown in FIG. 14 a user 1400 (e.g., a user operating user device 110) may exchange communications with a payment system 1402 (e.g., payment provider server 170). For example, user 1400 and payment system 1402 may exchange authorization information such as log-in information 1404 when a user sends log-in credentials to the payment system and the payment system notifies that user that they are logged-in.

The user 1400 and payment system 1402 may also exchange pattern registration information 1406 when the user instructs the payment system to open a pattern page for entering a pattern, chooses an image or a dot matrix option for a pattern entry image, draws a pattern (e.g., on the pattern entry image), associates the drawn pattern with a "Send Payment" action (as an example), and saves the pattern. When the user instructs the payment system to save the pattern, the payment system may generate internal communications 1408 for saving the pattern.

Figure 15:
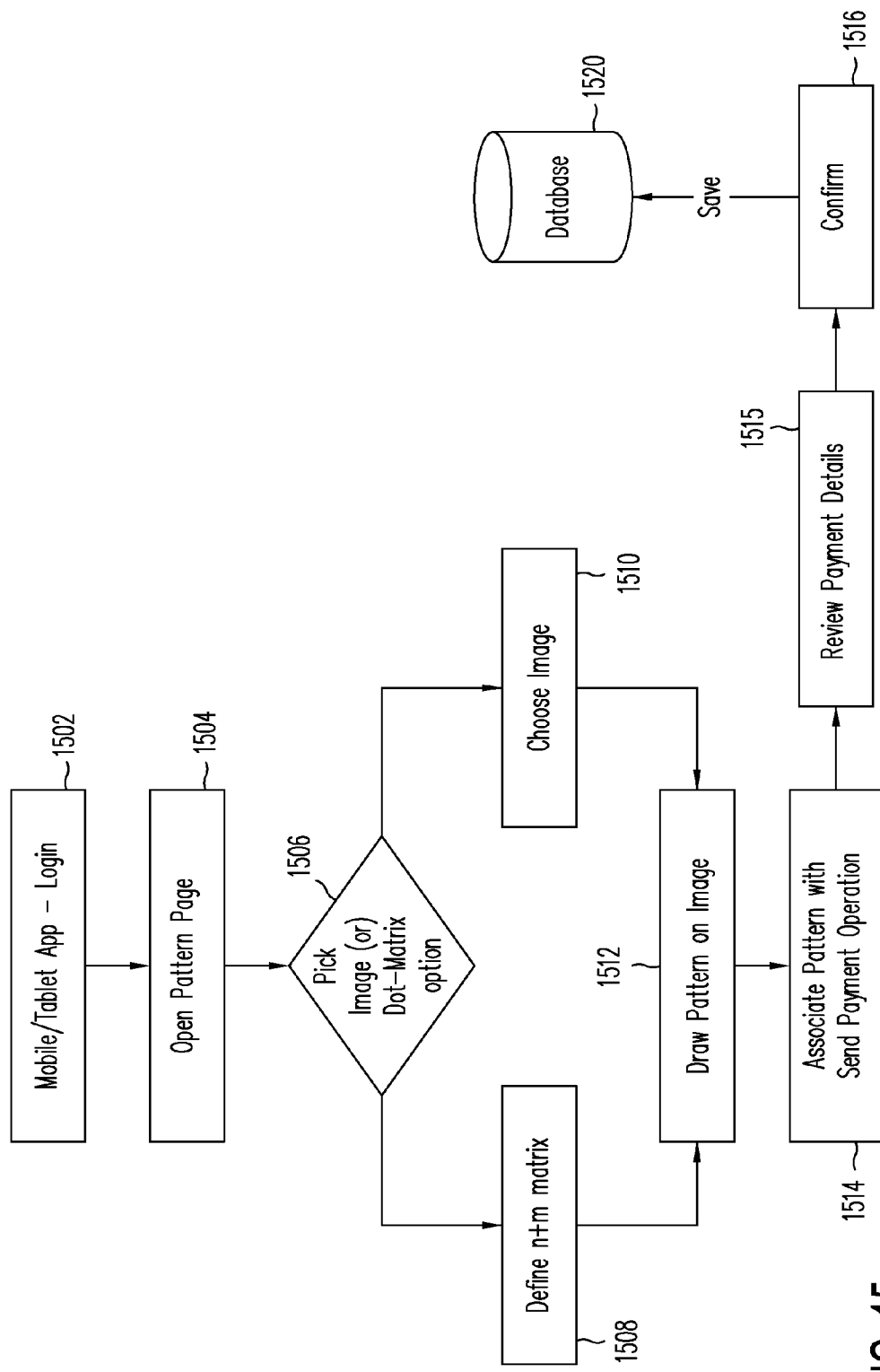
FIG. 15 is a flow diagram showing another illustrative process for registering a pattern to be used for online transactions according to an embodiment.

FIG. 15 is a flow diagram showing a method of use during which the communications of FIG. 14 may be exchanged according to an embodiment. As shown in FIG. 15, at block 1502, a user may execute a mobile or tablet application (as examples) log in to a payment system with a user device.

At block 1504, the user may open a pattern page such as a pattern entry page on the user device.

At block 1506, the user may select a dot-matrix or a user-provided image option.

At block 1508, if the user selects a dot-matrix option, the user may define the parameters (e.g., the numbers N and M of rows and columns of dots) for the dot matrix pattern entry image.

At block 1510, if the user selects the user-provided image option, the user may choose a pattern entry image.

At block 1512, the user may draw a pattern on the pattern entry image.

At block 1514, the user may associate the drawn pattern with an action such as a send payment operation with particular payment details to be performed.

At block 1515, the user may review the payment details for the send payment operations.

At block 1516, the user may confirm the payment details. The registered pattern (e.g., the pattern and the payment details) may then be stored on a database 1520 (e.g., memory of the payment provider server).

Figure 16:
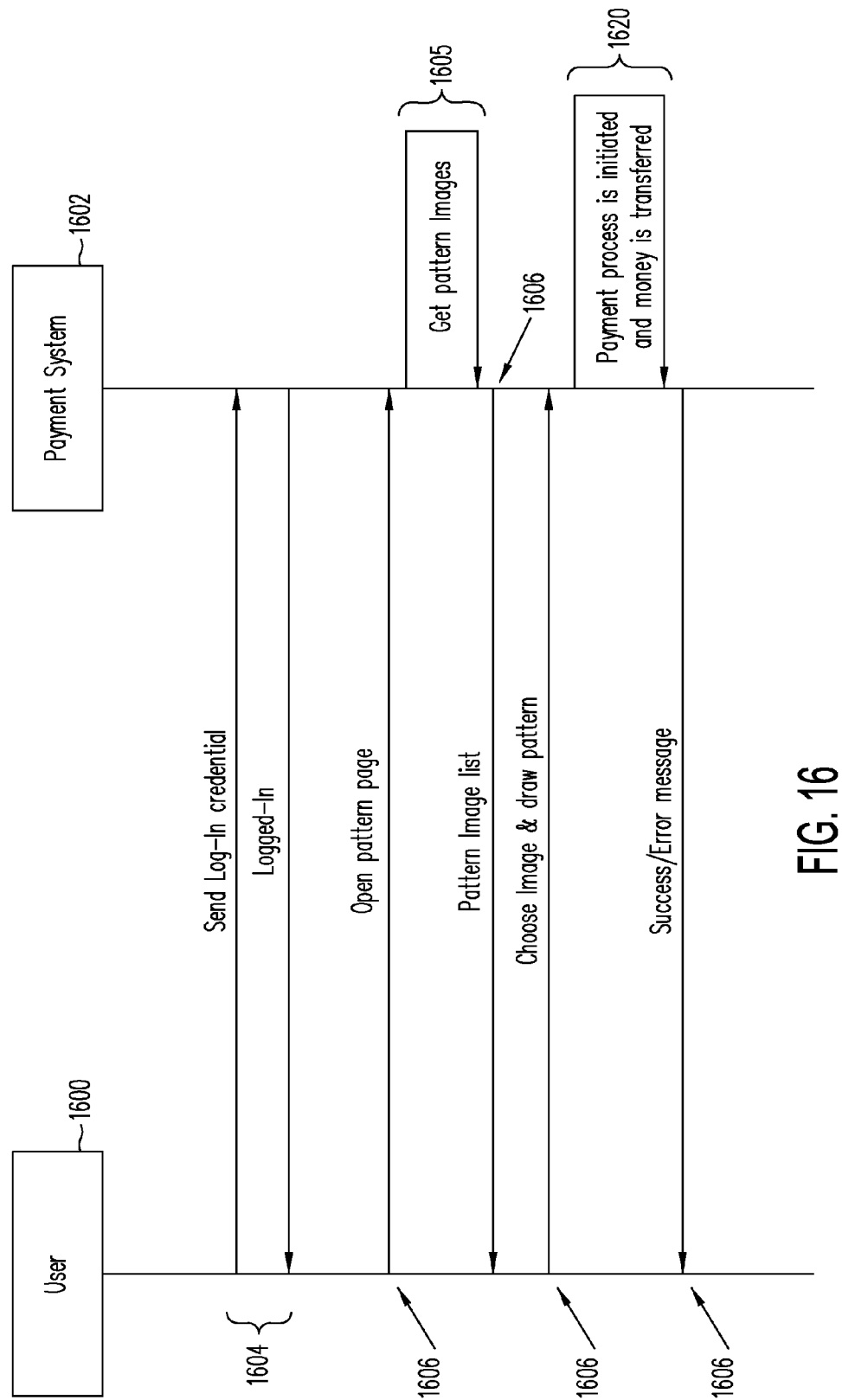
FIG. 16 is a diagram of illustrative communications between a user and a payment system during payment operations using a pattern entry image according to an embodiment.

FIG. 16 is a diagram of illustrative communications between a user and a payment system during a payment transaction using a pre-registered pattern according to an embodiment. As shown in FIG. 16, a user 1600 (e.g., a user operating user device 110) may exchange communications with a payment system 1602 (e.g., payment provider server 170). For example, user 1600 and payment system 1602 may exchange authorization information such as log-in information 1604 when a user sends log-in credentials to the payment system and the payment system notifies that user that they are logged-in.

The user 1600 and payment system 1602 may also exchange payment execution information 1606 when the user instructs the payment system to open a pattern page for entering a pattern, the payment system sends a pattern image list of possible pattern entry images, the user chooses a selected one of the pattern entry images and draws a pre-registered pattern, and the payment system sends a success or error message. When the user opens the pattern page, the payment system may generate internal communications 1605 to obtain (get) any pattern entry images (pattern images) associated with the user from storage such as a database. When the user chooses the image and draws the pre-registered pattern, the payment system may generate internal communications 1620 to initiate a payment process and transfer money as determined by the pre-registered pattern.

Figure 17:
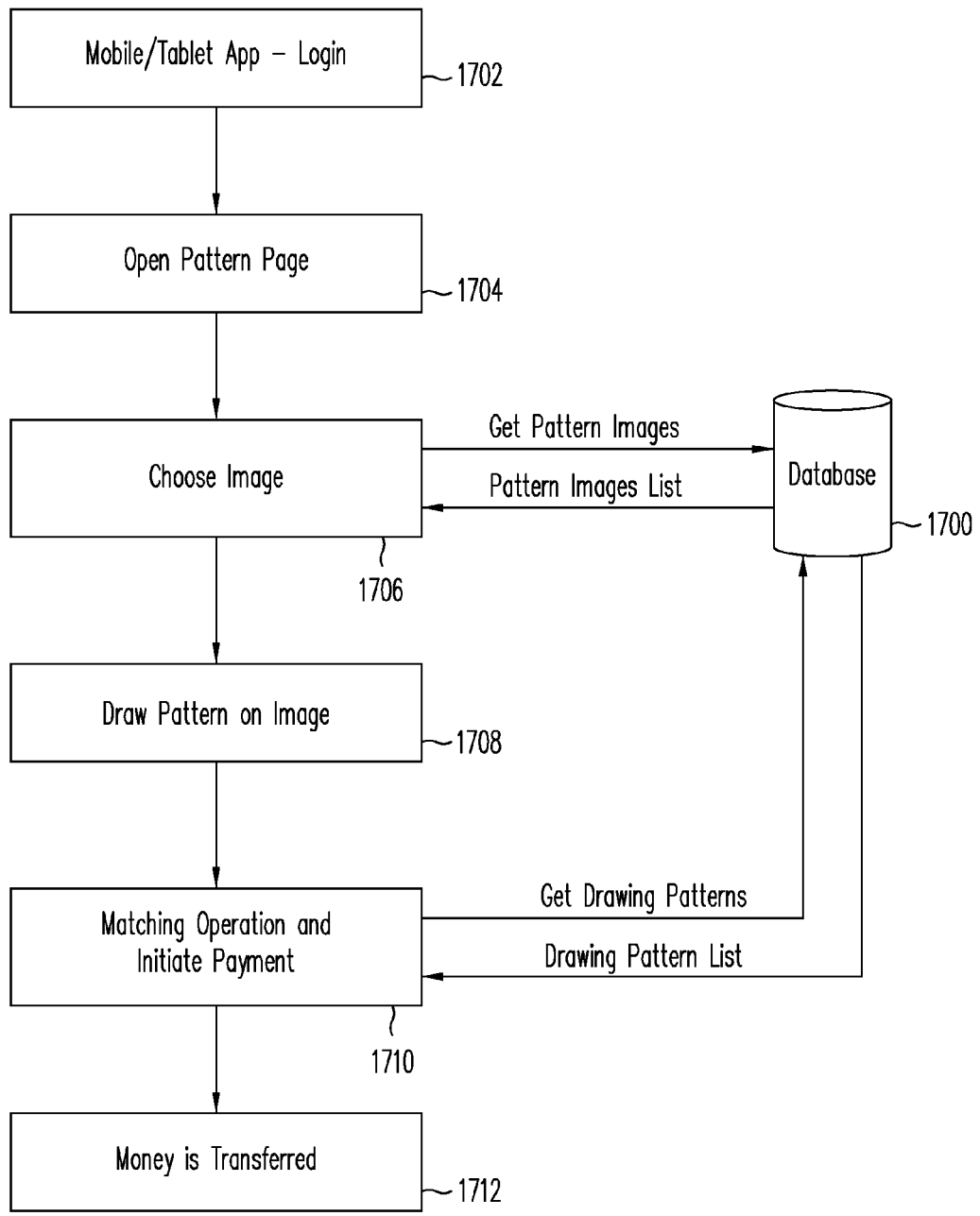
FIG. 17 is a flow diagram showing another illustrative process for making a payment using a pattern entry image according to an embodiment.

FIG. 17 is a flow diagram showing a method of use during which the communications of FIG. 16 may be exchanged according to an embodiment. As shown in FIG. 17, at block 1702, a user may execute a mobile or tablet application (as examples) log in to a payment system.

At block 1704, the user may open a pattern page such as a pattern entry page on the user device.

At block 1706, the user may choose a pattern entry image. The pattern entry image may be chosen when a payment system gets (obtains) pattern entry images from a database 1700 (e.g., a database of a payment provider server) and provides a pattern entry images list (pattern images list) to the user.

At block 1708, the user may draw a pattern on the pattern entry image.

At block 1710, the payment system may perform pattern matching operations as described herein by obtaining (getting) one or more drawing patterns from database 1700 and receiving a list of possible drawing patterns (e.g., drawing patterns to be compared with the drawn pattern of block 1708) from database 1700.

At block 1712, the payment system may transfer money for a payment associated with the drawn pattern of block 1708.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system, comprising:
a non-transitory memory; and
one or more hardware processors coupled to the non-transitory memory and configured to read instructions from the non-transitory memory to cause the system to perform operations comprising:
providing a pattern entry image to a user;
receiving pattern entry data that comprises a first pattern drawn by the user within a first location of a touchscreen user interface displaying a first object and a second pattern drawn by the user within a second location of the touchscreen user interface displaying a second object, the first location being non-overlapping with the second location; and
causing electronic commerce transactions to be performed based on the received pattern entry data, the electronic commerce transactions including a first electronic commerce transaction associated with the first object performed in response to the first pattern being drawn within the first location of the pattern entry image, and a second electronic commerce transaction associated with the second object is performed in response to the second pattern being drawn within the second location of the pattern entry image.

2. The system of claim 1, wherein the first pattern and the second pattern have different shapes.

3. The system of claim 1, wherein the operations further comprise: providing pattern association options to the user, and associating the electronic commerce transaction to be performed with the pattern entry data by receiving selected ones of the pattern association options from the user.

4. The system of claim 3, wherein the pattern association options comprise a transaction type option, a currency amount option, and a recipient option.

5. The system of claim 3, wherein the selected ones of the pattern association options comprise a specific currency amount to be sent or received by the user and wherein the pattern entry data corresponds to the specific currency amount.

6. The system of claim 3, wherein the selected ones of the pattern association options comprise a specific recipient or a specific payer of funds from or to the user and wherein the pattern entry data corresponds to the specific recipient or the specific payer.

7. The system of claim 1, wherein the pattern entry image is provided with a user-uploaded digital photograph, a dot matrix, or a merchant webpage.

8. The system of claim 7, wherein the user-uploaded digital photograph contains a person or an object.

9. A method, comprising:
providing, electronically by a hardware processor, a pattern entry image to a user;
receiving, electronically by the hardware processor, a pattern entry comprising a first pattern drawn by the user on a first location of a touchscreen user interface displaying a first object and a second pattern drawn by the user on a second location of the touchscreen user interface displaying a second object, the first location not overlapping with the second location;
recognizing, electronically by the hardware processor, the first pattern and the second pattern of the pattern entry;
obtaining, electronically by the hardware processor in response to the recognizing, stored pattern association selections associated with the pattern entry, wherein the stored pattern association selections specify a first transaction that is to be performed in response to the first pattern being drawn within the first location and a second transaction that is to be performed in response to the second pattern being drawn within the second location; and
executing, electronically by the hardware processor, the first transaction with the first object and the second transaction with the second object based on the pattern association selections.

10. The method defined in claim 9, wherein the pattern entry image is provided with a digital photograph, a multi-point matrix, or a web page.

11. The method defined in claim 9, wherein the stored pattern association selections comprise a currency amount and a recipient and wherein the executing comprises requesting a payment of the currency amount from the recipient.

12. The method defined in claim 9, wherein the stored pattern association selections comprise an invoice transaction type and a recipient and wherein the executing comprises:
generating an invoice; and
sending the invoice to the recipient.

13. The method defined in claim 10, wherein the digital photograph contains a person or an object.

14. A non-transitory machine-readable medium having stored thereon machine-readable instructions executable to cause a machine to perform operations comprising:
providing a pattern entry image to a user;
receiving a pattern entry comprising a first pattern drawn by the user on a first location of a touchscreen user interface displaying a first object and a second pattern drawn by the user on a second location of a touchscreen user interface displaying a second object;
recognizing the first pattern and the second pattern of the pattern entry;
obtaining, in response to the recognizing, stored pattern association selections associated with the pattern entry, wherein the stored pattern association selections specify a first transaction that is to be performed in response to the first pattern being drawn within the first location and a second transaction that is to be performed in response to the second pattern being drawn within the second location; and
executing the first transaction with the first object and the second transaction with the second object based on the pattern association selections.

15. The non-transitory machine-readable medium defined in claim 14, wherein the stored pattern association selections comprise a payment amount and a recipient and wherein the executing comprises sending a payment from the user to the recipient.

16. The non-transitory machine-readable medium defined in claim 14, wherein the pattern entry image is provided with a user-selected digital image, an N by M matrix, or a transaction webpage.

17. The non-transitory machine-readable medium defined in claim 14, wherein the transaction comprises an invoicing transaction and wherein the executing comprises:
   generating an invoice; and
   sending the invoice to a recipient.

18. The non-transitory machine-readable medium defined in claim 14, wherein the operations further comprise:
   receiving location-dependent amount change information from the user.

19. The method defined in claim 9, wherein the first pattern and the second pattern have different shapes.

20. The non-transitory machine-readable medium defined in claim 14, wherein the first pattern and the second pattern have different shapes.

* * * * *